United States Patent
Kim et al.

(10) Patent No.: US 7,391,900 B2
(45) Date of Patent: Jun. 24, 2008

(54) IMAGE PROCESSING METHOD FOR REMOVING GLASSES FROM COLOR FACIAL IMAGES

(75) Inventors: Hyoung Gon Kim, Seoul (KR); Sang Chul Ahn, Seoul (KR); You Hwa Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 195 days.

(21) Appl. No.: 10/532,658

(22) PCT Filed: May 10, 2003

(86) PCT No.: PCT/KR03/00927

§ 371 (c)(1),
(2), (4) Date: Dec. 8, 2005

(87) PCT Pub. No.: WO2004/040502

PCT Pub. Date: May 13, 2004

(65) Prior Publication Data

US 2006/0193515 A1    Aug. 31, 2006

(30) Foreign Application Priority Data

Oct. 31, 2002 (KR) ............ 10-2002-0066895
Jan. 30, 2003 (KR) ............ 10-2003-0006064

(51) Int. Cl.
*G06K 9/00* (2006.01)

(52) U.S. Cl. ............ 382/164; 382/118; 382/165; 382/275

(58) Field of Classification Search ............ 382/164
See application file for complete search history.

(56) References Cited

U.S. PATENT DOCUMENTS

| | | | | |
|---|---|---|---|---|
| 4,852,184 A * | 7/1989 | Tamura et al. | ............ | 382/282 |
| 5,576,778 A * | 11/1996 | Fujie et al. | ............ | 351/177 |
| 5,859,921 A * | 1/1999 | Suzuki | ............ | 382/118 |
| 5,926,575 A * | 7/1999 | Ohzeki et al. | ............ | 382/243 |
| 6,055,323 A * | 4/2000 | Okumura | ............ | 382/118 |
| 6,095,650 A * | 8/2000 | Gao et al. | ............ | 351/227 |
| 6,181,805 B1 * | 1/2001 | Koike et al. | ............ | 382/118 |
| 6,231,188 B1 * | 5/2001 | Gao et al. | ............ | 351/227 |
| 6,508,553 B2 * | 1/2003 | Gao et al. | ............ | 351/227 |
| 2002/0136435 A1 * | 9/2002 | Prokoski | ............ | 382/118 |
| 2003/0190060 A1 * | 10/2003 | Pengwu | ............ | 382/118 |

FOREIGN PATENT DOCUMENTS

JP        2002269545 A  *  9/2002

* cited by examiner

*Primary Examiner*—Vikkram Bali
*Assistant Examiner*—David P Rashid
(74) *Attorney, Agent, or Firm*—Jones Day

(57) ABSTRACT

A method for obtaining a glassless image is disclosed. The image processing method comprises the steps of (a) receiving an RGB color frontal facial image; (b) extracting candidates of eye regions from the received RGB color frontal facial image; (c) determining an exact eye region out of the candidates and normalizing the received RGB color frontal facial image; (d) extracting a glasses frame region by using color information contained in the received RGB color frontal facial image and edge information of a glasses frame; (e) performing an RGB-HSI transformation on the normalized frontal facial image; (f) generating H', S', and I' glassless compensated images; (g) obtaining R', G', and B' compensated images by performing an HSI-RGB transformation on the H', S', and I' glassless compensated images; and (h) creating a glassless final color facial image on the basis of the R', G', and B' compensated images.

17 Claims, 9 Drawing Sheets

(a)   (b)   (c)

IMAGE PROCESSING METHOD FOR REMOVING GLASSES FROM COLOR FACIAL IMAGES

CROSS-REFERENCE TO RELATED APPLICATIONS

This application claims priority of International Application No. PCT/KR03/00927, filed on May 10, 2003, which claims benefit of Korean Patent Application No. 10-2002-66895, filed on Oct. 31, 2002, and Korean Patent Application No. 10-2003-6064, filed on Jan. 30, 2003, the entire subject matters of which are incorporated herein by reference in their entireties.

TECHNICAL FIELD

The present invention relates to image processing fields, and more particularly, to an image processing method for removing glasses from a color facial image by using recursive principal component analysis (PCA) reconstruction.

BACKGROUND ART

As an information-oriented society has been come, person identification techniques for discriminating a person from others have become more important, and, thus there have been significant number of studies in the field of personal information protection and person identification through a computer using biometrical technologies. In biometrical technologies, facial recognition technique becomes the most convenient and competitive technique since it does not require a specified action or behavior of a user and employs a non-contact manner. The facial recognition technique is widely used in various applications such as identification, human-computer interface (HCI), and access control. However, there are several drawbacks in the facial recognition technique. One of these drawbacks is deformation of facial images occurred by glasses.

To remove glasses from a facial image with the glasses, various image processing methods are proposed: an algorithm for extracting glasses from a facial image using a deformable contour to remove the extracted glasses; an algorithm for removing small occlusion regions such as certain facial regions occluded by glasses using a flexible model that is called as an active appearance model; and an image processing method using PCA algorithm.

An image processing method using PCA algorithm is now widely used. The PCA algorithm is classified into two processes. One is a training process for extracting eigenfaces from a plurality of unspecified sample glassless facial images $\Gamma_N$, wherein N=1, 2, . . . ,M. The sample facial images $\Gamma_N$ include facial images of an individual and/or another individuals. The other is a process for obtaining glassless reconstruction images from current input facial images $\Gamma$ with glasses by using the extracted eigenfaces.

Descriptions of the training process for extracting eigenfaces will be first described in detail. An average image $\varphi$ are calculated from the sample facial images $\Gamma_N$ for use in the training process by using Equation 1 and the average image $\varphi$ is subtracted from the sample facial images $\Gamma_N$ as expressed in Equation 2, wherein each of the sample facial images $\Gamma_N$ is expressed as a column vector.

$$\varphi = \frac{1}{M} \sum_{N=1}^{M} \Gamma_N. \quad \text{(Eq. 1)}$$

$$\Phi_N = \Gamma_N - \varphi. \quad \text{(Eq. 2)}$$

Then, a covariance matrix C with respect to the sample facial images $\Gamma_N$ is obtained from differential images $\Phi_N$, which is calculated by subtracting the average image $\varphi$ from each of the sample facial images $\Gamma_N$ by using the following Equation 3.

$$C = \frac{1}{M} \sum_{N=1}^{M} \Phi_N \Phi_N^T = AA^T \quad \text{(Eq. 3)}$$

$$A = [\Phi_1, \Phi_2, \cdots, \Phi_M]$$

wherein A is a matrix composed of the differential images $\Phi_N$ and $A^T$ is a transpose of A.

Consequently, eigenvectors are obtained from the covariance matrix C, wherein the eigenvectors is referred to eigenfaces $u_k$(k=1, . . . ,M). Detailed description for a process of obtaining the eigenfaces $u_k$ will be omitted because this process is well known to those skilled in the art.

Next, the input facial images $\Gamma$ with glasses are expressed as glassless reconstruction images $\hat{\Gamma}$ by using the eigenfaces $u_k$. With the following Equation 4, the average image $\varphi$ is subtracted from the input facial images $\Gamma$, and the resultant is projected to the respective eigenfaces $u_k$.

$$\omega_k = u_k^T (\Gamma - \varphi), k=1, \ldots, M \quad \text{(Eq. 4)}$$

wherein $\omega_k$ is a weight which allows the input facial images $\Gamma$ to be expressed on a space consisting of the eigenfaces $u_k$. The reconstruction images $\hat{\Gamma}$ are also expressed in terms of the sum of weights of the eigenfaces $u_k$ extracted from the sample facial images $\Gamma_N$ by using the following Equation 5.

$$\hat{\Gamma} = \varphi + \sum_{k=1}^{M'} \omega_k u_k, \quad \text{(Eq. 5)}$$

$$M' \leq M$$

wherein a number of the eigenfaces $u_k$ required is equal to M or to M' less than M, M being a total number of the eigenfaces $u_k$.

Where eigenfaces $u_k$ are extracted from the sample facial images $\Gamma_N$ as described above, the extracted eigenfaces $u_k$ include facial characteristics only so that final glassless facial images can be obtained by reconstructing the input facial images $\Gamma$ on the basis of the extracted eigenfaces $u_k$ to produce the reconstruction images $\hat{\Gamma}$. However, the reconstruction images $\hat{\Gamma}$ produced according to the conventional method have many errors thereon. Referring to FIG. 1, which shows that glasses are not removed completely although the reconstruction images $\hat{\Gamma}$ are similar to the input facial images $\Gamma$, and there are numerous errors over the reconstruction images $\hat{\Gamma}$. In FIG. 1, "client" is a person included in a training set and "non-client" is a person excluded in the training set. Although there are numerous errors as shown in FIG. 1, the reconstruction images $\hat{\Gamma}$ of "clients" are better than those of "nonclients" in quality since facial characteristics are reflected in the extracted eigenfaces $u_k$.

However, there are some problems in regarding the reconstruction images $\hat{\Gamma}$ obtained according to the conventional method as complete glassless facial images. Firstly, if the reconstruction images $\hat{\Gamma}$ are generated with respect to the input facial images $\Gamma$ on the basis of the eigenfaces $u_k$ that are extracted from the sample facial images $\Gamma_N$ included in the training set, particular characteristics of the input facial images $\Gamma$ would not be appeared on the reconstruction images $\hat{\Gamma}$. Secondly, if occlusion regions due to glasses are considerable in the input facial images $\Gamma$, the reconstruction images $\hat{\Gamma}$ will include many errors thereon so that these may appear to be unnatural and different from the input facial images $\Gamma$.

As described above, since problems due to glasses in the input facial images $\Gamma$ are merely regarded as the matter of glasses frame, many limitations are arisen in the conventional methods so that obtaining high quality glassless facial images is very difficult.

DISCLOSURE OF THE INVENTION

It is, therefore, an objective of the present invention to provide an image processing method using recursive PCA reconstruction, which is capable of obtaining glassless color facial images with a high quality resolution similar to input glasses color facial images, by removing all occlusion regions including not only glasses frame region but also occlusion regions due to reflection by lens and shades by glasses within the input glasses color facial images.

In accordance with the present invention, an image processing method for obtaining a glassless image from a color frontal facial image bearing glasses, comprising the steps of: a) receiving an RGB color frontal facial image bearing glasses, wherein RGB are red-, green-, and blue-component contained in the received RGB color frontal facial image; b) extracting candidates of eye regions from the received RGB color frontal facial image; c) determining an exact eye region out of the candidates and normalizing the received RGB color frontal facial image in a predetermined size by centering on the determined eye region; d) extracting a glasses frame region by using color information contained in the received RGB color frontal facial image and edge information of a glasses frame; e) performing an RGB-HSI transformation on the normalized frontal facial image; f) generating H', S', and I' glassless compensated images on the basis of the RGB-HSI transformed H-, S-, and I-component normalized frontal facial images, wherein the H-, S-, and I-component represent a hue, a saturation, and an intensity, respectively; g) obtaining R', G', and B' compensated images by performing an HSI-RGB transformation on the H', S', and I' glassless compensated images; and h) creating a glassless final color facial image on the basis of the R', G', and B' compensated images.

BRIEF DESCRIPTION OF THE DRAWINGS

The above and other objects and features of the present invention will become apparent from the following description of preferred embodiments given in conjunction with the accompanying drawings.

BEST MODE FOR CARRYING OUT THE INVENTION

Now, embodiments in accordance with the image processing method of the present invention will be described in detail with reference to FIGS. 2 to 14.

Figure 11:
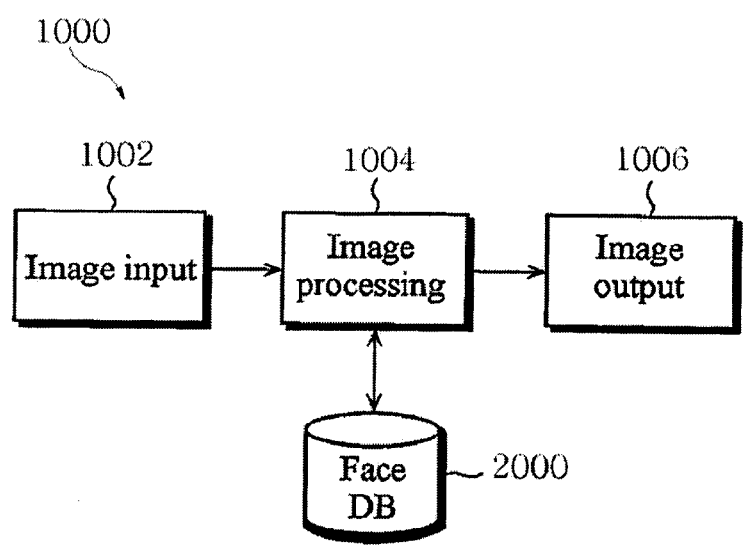
FIG. 11 is a block diagram of an image processing system in accordance with the present invention.

Referring first to FIG. 11, which is a block diagram of an image processing system employing recursive principal component analysis (PCA) reconstruction in accordance with the present invention. As shown, image processing system 1000 in accordance with the present invention comprises image input unit 1002, image processing unit 1004, image output unit 1006, and face database (DB) 2000.

Image input unit 1002 receives color input facial images with glasses and transmits them to image processing unit 1004. Image input unit 1002 is implemented with a conventional image input device such as a digital camera. Image processing unit 1004 performs an image process in accordance with the present invention on the color input facial images received from image input unit 1002 and generates glassless color facial images. Image processing unit 1004 is implemented with a conventional computing device. Face DB 2000 stores the color input facial images and intermediate images of the color input facial images generated during the image process performed by image processing unit 1004.

Face DB 2000 also stores glassless sample facial images, which are used in the recursive PCA reconstruction to be described in below. Image output unit 1006 outputs glassless color facial images, which are generated by image processing unit 1004. Image output unit 1006 is implemented with a conventional display device such as a monitor.

Figure 1:
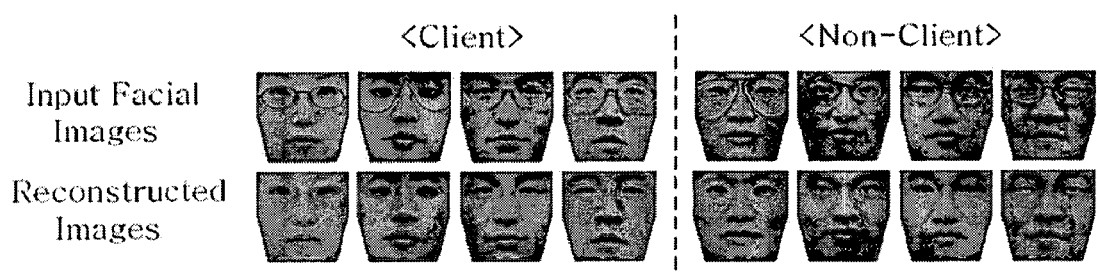
FIG. 1 is input facial images with glasses and glassless reconstruction facial images obtained according to a conventional image processing method using PCA reconstruction.
Figure 2:
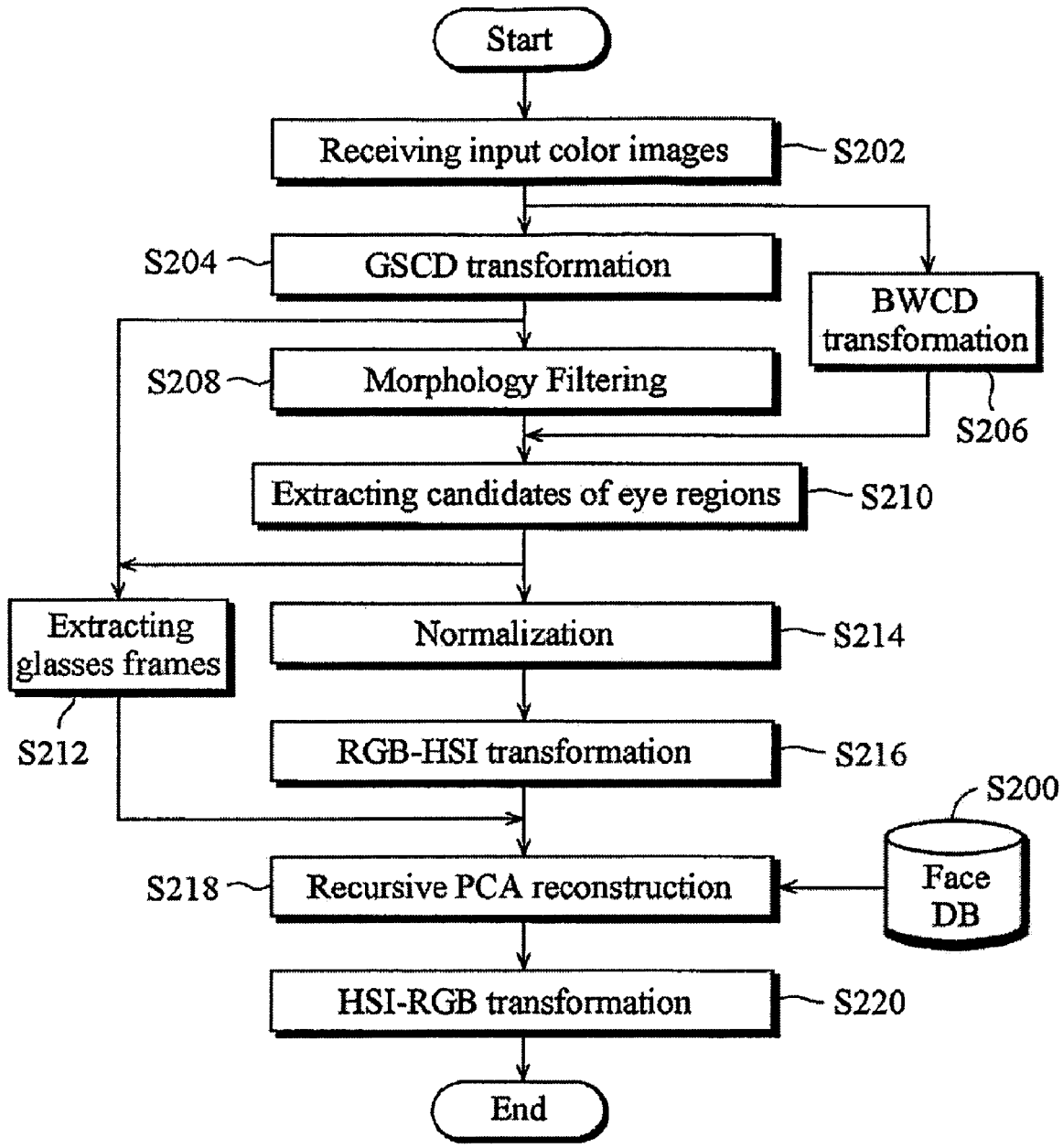
FIG. 2 is a flow diagram of a process of removing glasses from color input facial images in accordance with an image processing method, which employs recursive PCA reconstruction of the present invention.

Referring to FIG. 2, which is a flow diagram of a process of removing glasses from input color facial images in accordance with an image processing method of the present invention. The image processing method employs recursive PCA reconstruction in accordance with the present invention. Image processing system 1000 first receives color input facial images with glasses from image input unit 1002 (step S202).

Image processing unit 1004 of image process system 1000 obtains binary generalized skin color distribution (GSCD) transform images, which enhance skin colors of faces in the color input facial images by using color information contained therein (step S204). Also, image processing unit 1004 obtains binary black and white color distribution (BWCD) transform images, which enhance black and white colors of faces in the color input facial images by using the color information (step S206). Obtaining the binary GSCD and BWCD transform images from the color input facial images is performed by a known method in the art.

In order to find candidates of eye regions required for normalizing the color input facial images, image processing unit 1004 removes certain regions having colors different from the skin color, such as eye, eyebrow, mouth, or slipping-down hairs, from the binary GSCD transform images by performing a morphology filtering (step S208). Image processing unit 1004 extracts the candidates from the color input facial images by using the binary BWCD transform images and the morphology filtered GSCD transform images (step S210). Image processing unit 1004 determines exact eye regions out of the candidates and normalizes the color input facial images with a predetermined size by centering on the exact eye regions (step S214). The normalized color input facial images are represented as primary color components of red, green, and blue in a red-green-blue (RGB) model.

Image processing unit 1004 generates normalized hue (H), saturation (S), and intensity (I) components input facial images of by performing an RGB-HSI transformation on the normalized color input facial images (step S216). As is well known in the art, RGB model images are easily transformed into HSI model images and vice versa. In the present invention, in order to process the color input facial images, the RGB-HSI transformation is performed on the normalized color input facial images by using Equation 6.

$$I = \frac{1}{3}(R + G + B) \quad \text{(Eq. 6)}$$

$$S = 1 - \frac{3}{(R + G + B)}[\min(R + G + B)]$$

$$H = \cos^{-1}\left\{\frac{\frac{1}{2}[(R - G) + (R - B)]}{[(R - G)^2 + (R - B)(G - B)]^{\frac{1}{2}}}\right\}$$

if, $(B > G)$ then $H = 360° - H$ wherein H-component has a value of 0 to 360 degrees, S-component has a value of 0 to 1, and I-component has a value of 0 to 255.

Meanwhile, image processing unit 1004 extracts glasses frames using the color information of the color input facial images and edge information of the glasses frames in the color input facial images (step S212). Detailed description of this procedure will be made with reference to FIG. 4.

Figure 4:
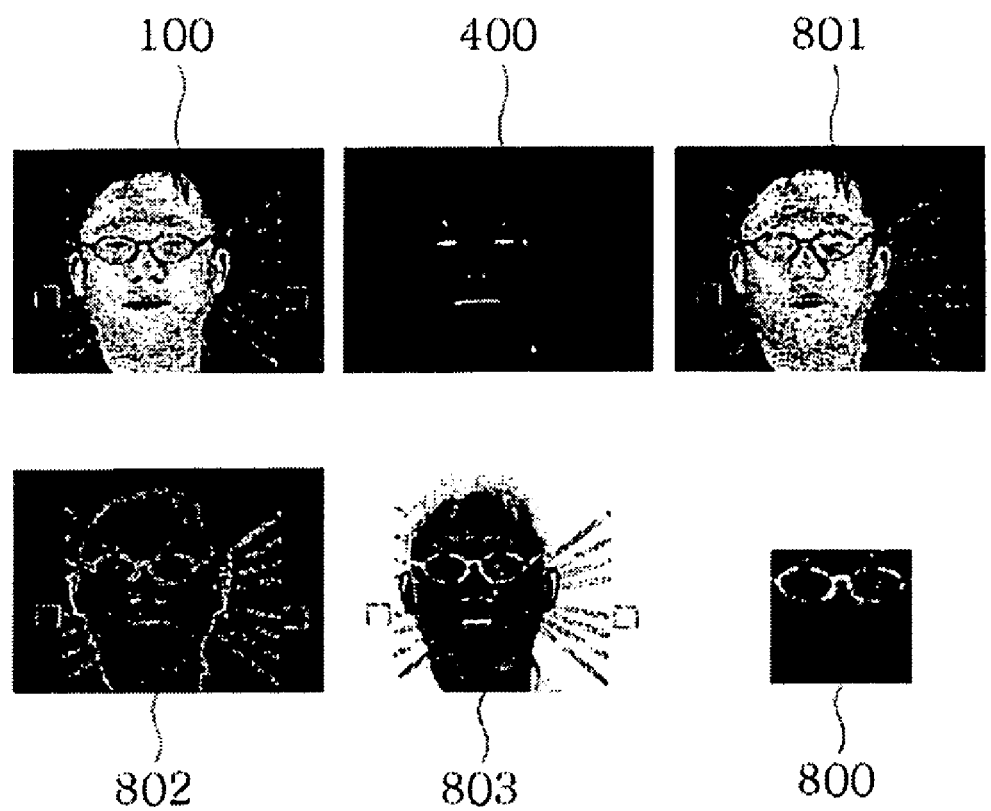
FIG. 4 is a diagram of a process of extracting a glasses frame region from each of the color input facial images in accordance with the present invention.
Figure 5:
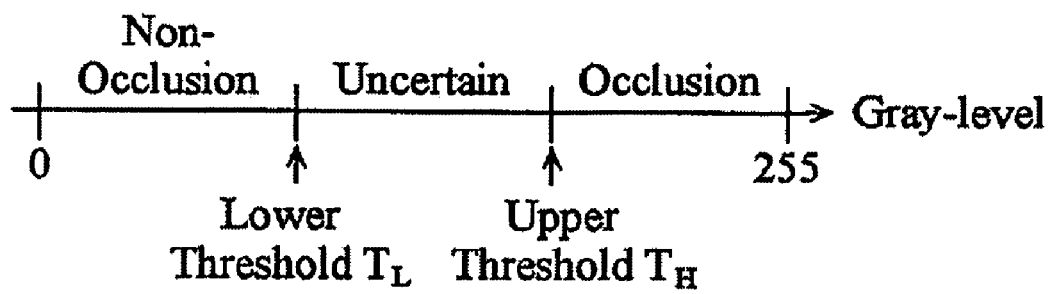
FIG. 5 is a criterion for determining an occlusion region in each differential image on the basis of a gray-level in accordance with the present invention.

Referring to FIG. 4, image processing unit 1004 performs an AND operation on the morphology filtered GSCD transform images obtained at step S208 and the binary BWCD transform images obtained at step S206, to thereby obtain image 400. Image 400 shows black and white regions in the color input facial images and includes eye and eyebrow regions. Next, image processing unit 1004 performs an OR operation on image 400 and image 100 that is a GSCD transform image of gray-level obtained at step S204, to thereby obtain image 801. Image 801 is an image of which eliminates eyes and eyebrows from image 100. In order to accurately represent the glasses frames included in the color input facial images, image processing unit 1004 detects edges of the glasses frame in image 801 through the well-known Sobel method to generate image 802. Image processing unit 1004 performs an OR operation on image 802 and an inversion image of image 801 to obtain image 803, and then normalizes image 803 with the same size as the normalized color input facial images at step S214, to thereby obtain image 800 (hereinafter, referred to glasses frame image G 800) using location information of the glasses frame. Glasses frame image G 800 contains a glasses frame region only.

Referring back to FIG. 2, image processing unit 1004 obtains compensated images of H-, S-, and I-components by applying the recursive PCA reconstruction with respect to the normalized color input facial images of H-, S-, and I-components (step S218). Image processing unit 1004 then performs the HSI-RGB transformation on the compensated image of H-, S-, and I-components to obtain final glassless color facial images (step S220).

Figure 3:
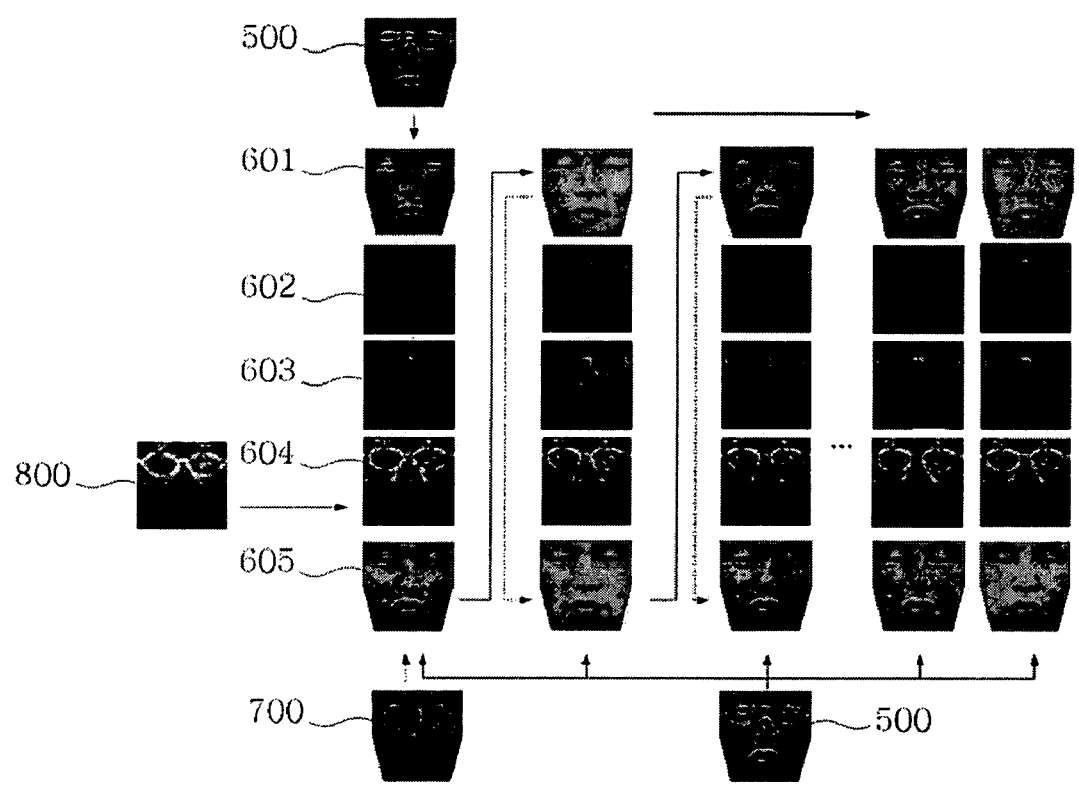
FIG. 3 is a diagram for explaining the recursive PCA reconstruction of processing normalized facial images of an intensity component (I-component) in accordance with the present invention.

Referring to FIG. 3, which shows a diagram for explaining the recursive PCA reconstruction in which image processing unit 1004 processes the normalized I-component input facial images out of the RGB-HSI transform images at step S218. First, image processing unit 1004 reconstructs the normalized I-component input facial images according to the conventional PCA algorithm. Hereinafter, the normalized I-component input facial images are referred to I-component normalized images Γ(i) 500, wherein i is an index to indicate pixels within I-component normalized images Γ(i) 500. That is, resultant images reconstructed according to Equation 5 becomes images corresponding to 601 of FIG. 3 (hereinafter, referred to I-component reconstructed images $\hat{\Gamma}$(i) 601). Using Equation 7, image processing unit 1004 calculates differential images between I-component normalized images Γ(i) 500 and I-component reconstructed images $\hat{\Gamma}$(i) 601, to obtain images corresponding to 602 of FIG. 3 (hereinafter, referred to I-component differential images d(i) 602).

$$d(i) = |\Gamma(i) - \hat{\Gamma}(i)| \quad \text{(Eq. 7)}.$$

As shown, glasses frames overlapping with eyebrows are not extracted completely in I-component differential images d(i) 602. This results from a lower difference in gray-level between I-component normalized images Γ(i) 500 and I-component reconstructed images $\hat{\Gamma}$(i) 601 since the glasses frames overlapping with the eyebrows in I-component normalized images Γ(i) 500 are represented as eyebrows having low gray-level in I-component reconstructed images $\hat{\Gamma}$(i) 601. If the glasses frames overlapping with the eyebrows are not removed completely, facial features may be degraded so that obtaining reconstructed images similar to I-component normalized images Γ(i) 500 is very difficult. In order to accurately find regions of the glasses frames overlapping with the eyebrows, i.e., occlusion regions, the present invention employs glasses frame image G 800 (shown in FIG. 4) extracted at step S212 of FIG. 2.

Image processing unit 1004 stretches I-component differential images d(i) 602 after reflecting gray-level information corresponding to the face therein, to thereby create images corresponding to 603 of FIG. 3 (hereinafter, referred to I-component differential images D(i) 603) according to Equation 8. That is, I-component differential images D(i) 603 are created by taking square roots to the product of gray-level intensities with respect to I-component differential images d(i) 602 and I-component reconstructed images $\hat{\Gamma}$(i) 601.

$$D(i)=(\hat{\Gamma}(i)d(i))^{1/2} \quad \text{(Eq. 8)}.$$

Using I-component differential images D(i) 603 is advantageous as follows. Emphasizing a difference of gray-level intensities with respect to the occlusion regions due to the glasses frames is possible and thus the occlusion regions are easily removed. This results in obtaining more natural looking glassless images. Further, decreasing variation of gray-level intensities with respect to the facial features, such as eyes and eyebrows, in I-component normalized images Γ(i) 500 is possible so that I-component normalized images Γ(i) 500 can be used as these stand.

In order to include glasses frame image G 800 in I-component differential images D(i) 603, classifying I-component differential images D(i) 603 into occlusion regions and non-occlusion regions is necessary. Error distribution in I-component differential images D(i) 603 appears in the occlusion regions due to the glasses greater than the non-occlusion regions. With error distribution, the occlusion and non-occlusion regions are classified in a gray-level range of 0 to 255 shown in FIG. 5. Thresholds for classifying the regions are determined by Equation 9.

$T_L$=mean(D(j)), where, j ∈ skin region $T_H$=mean(D(k)), (Eq. 9)

where, k ∈ {j|D(j)>$T_L$}, j ∈ non-skin region wherein $T_L$ and $T_H$ are lower and upper thresholds, respectively; D(j) is error values in the non-occlusion regions; and D(k) is error values in the occlusion regions.

Detailed description of calculating the lower and upper thresholds $T_L$ and $T_H$ will be followed. In order to find non-occlusion regions in I-component normalized images Γ(i) 500, image processing unit 1004 performs OR operation with an inversion image (shown in image (a) of FIG. 6) of the binary GSCD transform image, and the binary BWCD transform image (shown in image (b) of FIG. 6). Once more, image processing unit 1004 normalizes the resultant image with the same size of I-component normalized images Γ(i) 500, centering on locations of eyes, to obtain an image (shown in image (c) of FIG. 6). In image (c) of FIG. 6, dark regions are obtained by emphasizing the skin color in I-component normalized images Γ(i) 500 and belong to the non-occlusion regions. Accordingly, the lower threshold $T_L$ is obtained by computing an average of errors occurred in the non-occlusion regions within I-component differential images D(i) 603.

Figure 6:
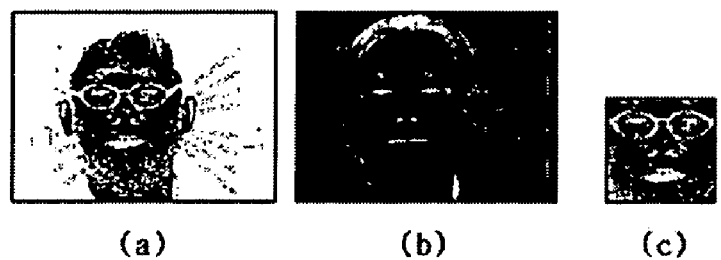
FIGS. 6a to 6c are images classified into skin and non-skin color regions by using color information of the color input facial images in accordance with the present invention.
Figure 7:
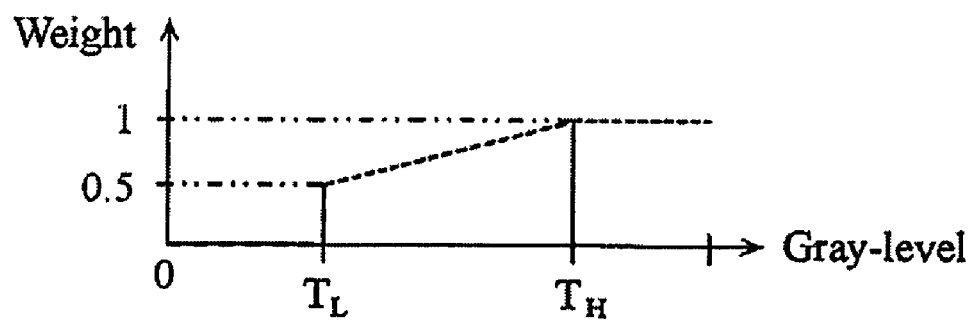
FIG. 7 is a range of weights for compensating the reconstruction facial images in accordance with the present invention.

On the other hand, the occlusion regions by the glasses are obtained by emphasizing the non-skin colors in I-component normalized images Γ(i) 500 and expressed as white regions in image (c) of FIG. 6. Accordingly, the upper threshold $T_H$ is obtained by computing an average of errors that are greater than the lower threshold $T_L$ within I-component differential images D(i) 603.

Here, uncertain regions still exist in I-component differential images D(i) 603. The uncertain regions contain errors greater than the lower threshold $T_L$ and smaller than the upper threshold $T_H$. The glasses frame regions are not contained in the occlusion regions since values of gray-level of the glasses frame regions in I-component differential images D(i) 603 are likely to include errors less than the upper threshold $T_H$. Therefore, in order to include the glasses frame regions in the vicinity of eyebrows into the occlusion regions, glasses frame image G 800 extracted at step S212 is used. In Equation 10, where values out of errors in I-component differential images D(i) 603 have a gray-level less than the upper threshold $T_H$, a value G(i) having a gray-level greater than the upper threshold $T_H$ is used in glasses frame image G 800. Images obtained through the above described procedures are I-component differential images D'(i) 604 shown in FIG. 3.

If, $D(i) < T_H$ then $D'(i) = \max(D(i), G(i))$, where, i=1, ..., N (Eq. 10)

if, $D(i) \geq T_H$ then $D'(i) = D(i)$

I-component differential images D'(i) 604 are used for removing the occlusion regions due to the glasses I-component normalized images Γ(i) 500. Error values in I-component differential images D'(i) 604 have a gray-level range from 0 to 255. The error values are classified into non-occlusion regions, occlusion regions, and uncertain regions on the basis of the defined thresholds $T_L$ and $T_H$. And then, according to Equation 11, a different weight is given to the non-occlusion, occlusion, and uncertain regions of I-component differential images D'(i) 604.

If, $D'(i) \geq T_H$ (Eq. 11)

then $\omega(i) = 1$ if, $T_L \leq D'(i) < T_H$ then $\omega(i) = 1 - 0.5 \dfrac{T_H - D'(i)}{T_H - T_L}$ else $\omega(i) = 0$ wherein ω(i) are weights with respect to I-component differential images D'(i) 604.

Weights of 1 are given to the occlusion regions having error values greater than the upper threshold $T_H$ and weights of 0 are given to the non-occlusion regions having error values smaller than the lower threshold $T_L$. Herein, the weights of 0 indicate that no change occurs in the original input facial images. Weights of 0.5 to 1 are given to the uncertain regions. Although the lowest weights, i.e., 0.5, was determined by experiments, but not limit thereto, employing values capable of compensating unnatural looking facial images after removing the occlusions due to the glasses within I-component normalized images Γ(i) 500 is possible. This compensates only regions considered as parts of the glasses within I-component normalized images Γ(i) 500. As described above, the weights (shown in FIG. 7) given by Equation 11 are used for compensating the occlusion regions due to the glasses within I-component differential images D'(i) 604 according to Equation 12.

If (t=0)

then $$\Gamma_t'(i) = \omega \cdot \phi + (1-\omega) \cdot \Gamma(i) \quad \text{(Eq. 12)}$$

else $$\Gamma_t'(i) = \omega \cdot \hat{\Gamma}_t(i) + (1-\omega) \cdot \Gamma(i)$$

wherein $\Gamma_t'(i)$ is I-component compensated images 605 without bearing the glasses in accordance with the present invention.

Where weights are 0, regions are determined as the non-occlusion regions so that I-component normalized images Γ(i) 500 are used. Where weights are 1, regions are determined as the occlusion regions. In the case of the occlusion regions, at a first iteration (t=0) (i.e., a first column of FIG. 3) of the recursive PCA reconstruction in accordance with the present invention, I-component compensated images 605 are obtained using I-component average image ϕ 700, which is calculated from the sample facial images $\Gamma_N$. The reason why I-component average image ϕ 700 is used is that I-component reconstructed images $\hat{\Gamma}(i)$ 601 are not glassless images in which the glasses included in I-component normalized images Γ(i) 500 are completely removed. Accordingly, from the second iteration (i.e., the second column shown in FIG. 3), the glasses are removed using I-component reconstructed images $\hat{\Gamma}(i)$ 601, which are obtained by reconstructing I-component compensated images 605 obtained at the first iteration (t=0).

Where weights have a range from 0.5 to 1, regions are determined as the uncertain regions. Thus, the glasses are removed such that the weights are applied to the combination of I-component normalized images Γ(i) 500 and I-component average image ϕ 700, or I-component normalized images Γ(i) 500 and I-component reconstructed images $\hat{\Gamma}(i)$ 601. Specifically, at the first iteration (t=0) of the inventive recursive PCA reconstruction, the glasses are removed by using the sum of resultant values upon multiplying a weight ω to gray-level intensities of the uncertain region within I-component average image ϕ 700, and upon multiplying a weight (1−ω) to gray-level intensities of regions within I-component normalized image Γ(i) 500, the regions corresponding to the uncertain region within I-component average image ϕ 700. From the second iteration, the recursive PCA reconstruction is performed by using I-component normalized image Γ(i) 500 and I-component reconstructed image $\hat{\Gamma}(i)$ 601 reconstructed from I-component compensated image 605 at the first iteration (t=0).

For example, in the first column of FIG. 3 except I-component normalized image Γ(i) 500, I-component reconstructed and compensated images $\hat{\Gamma}(i)$ 601 to 605 are generated such that finding the glasses regions within I-component normalized image Γ(i) 500 is performed and then processing the glasses regions is performed using I-component average image ϕ 700 as described above. I-component reconstructed and compensated images $\hat{\Gamma}(i)$ 601 to 605 in the second column of FIG. 3 are generated on the basis of I-component reconstructed image $\hat{\Gamma}(i)$ 601 reconstructed from I-component compensated image 605 at the first iteration (t=0) and I-component normalized images Γ(i) 500. Such procedure is applied to subsequent columns from the third iteration. The inventive recursive PCA reconstruction is repeated until a difference between I-component reconstructed images $\hat{\Gamma}(i)$ 601 is less than a predetermined value θ or it is constantly maintained as defined in Equation 13.

$$\|\hat{\Gamma}_t(i) - \hat{\Gamma}_{t+1}(i)\| \le \theta \quad \text{(Eq. 13)}$$

Figure 9:
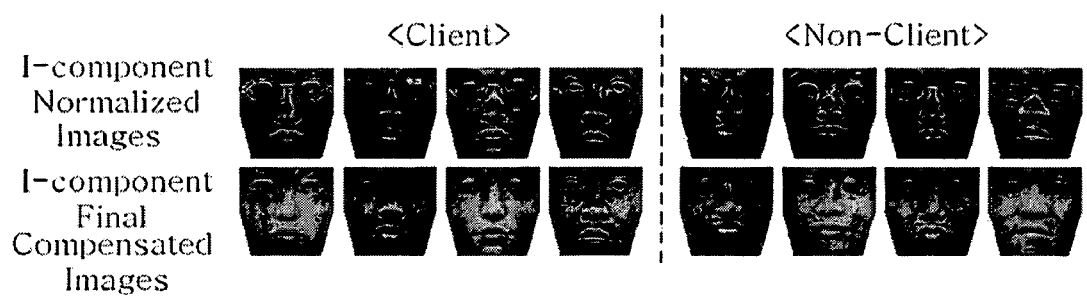
FIG. 9 is the I-component normalized images and I-component compensated images obtained from the I-component input facial images in accordance with the present invention.
Figure 10:
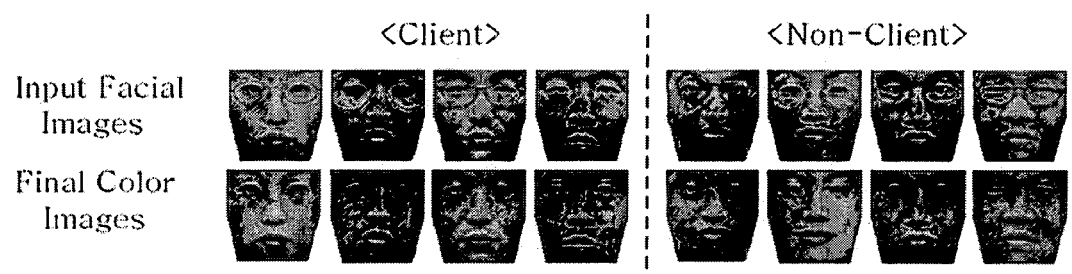
FIG. 10 is the input color facial images and final color images obtained from the input facial images in accordance with the present invention.

When the iteration of the recursive PCA reconstruction stops, compensated facial image, which is generated at the last iteration shown at right-bottom of FIG. 3, i.e., one of I-component compensated images 605, becomes an I-component final compensated image. Examples of I-component final compensated images are shown in FIG. 9. Hereinafter, the I-component final compensated image will be referred as an I' image.

Figure 8:
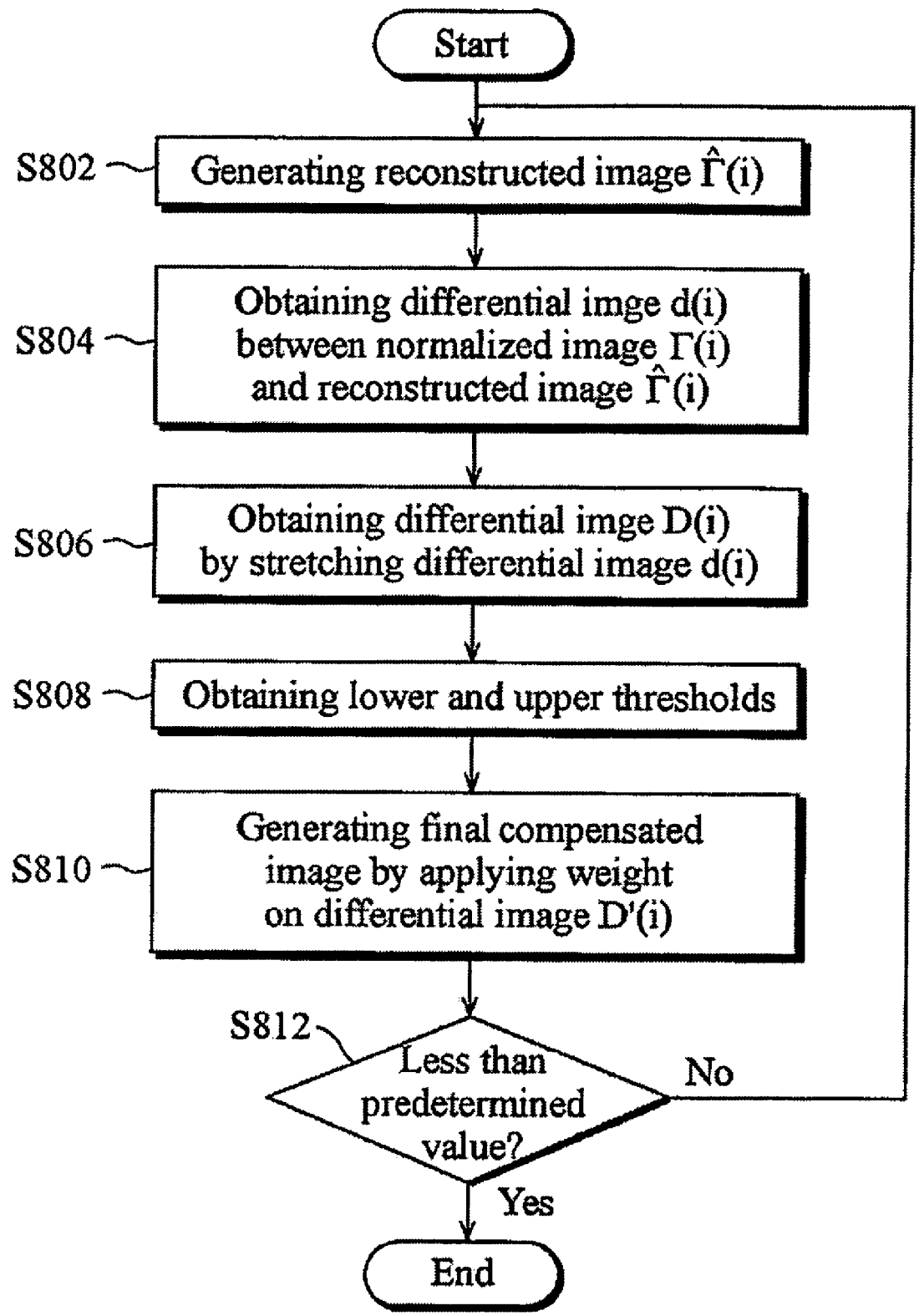
FIG. 8 is a flow diagram for processing normalized facial images of saturation and hue components (S- and H-components) in the recursive PCA reconstruction in accordance with the present invention.

Referring to FIG. 8, which is a flow diagram for processing S- and H-components normalized images obtained at step S216 in accordance with the inventive recursive PCA reconstruction. In order to obtain glassless color images, it is necessary to perform the recursive PCA reconstruction with respect to not only the I-component normalized images as described with reference to FIG. 3, but also the S- and H-components normalized images. Unlike the afore-mentioned recursive PCA reconstruction with respect to the I-component normalized images, glasses frame image G 800 extracted at step S212 shown in FIG. 2 is not used in the recursive PCA reconstruction with respect to the S- and H-components normalized images. The reason why glasses frame image G 800 is not used that occlusion regions obtained from the S- and H-components images are different from those of the I-component normalized images.

First, detailed description of the recursive PCA reconstruction with respect to the S-component normalized image will be followed. Hereinafter, the S-component normalized image shown in FIG. 12 will be referred as an S-component normalized image Γ(i). Before performing the recursive PCA reconstruction, image values of the S-component normalized image Γ(i) containing glasses are stretched to have values from 0 to 255.

At step S802, image processing unit 1004 shown in FIG. 11 reconstructs the S-component normalized image Γ(i), which is obtained at step S216 of FIG. 2, by using an S-component average image ϕ and eigenfaces $u_k$ through Equation 5, to thereby create an S-component glassless reconstructed image $\hat{\Gamma}(i)$. The S-component average image ϕ and eigenfaces $u_k$ are calculated on the basis of the sample facial images $\Gamma_N$ stored on face DB 2000 shown in FIG. 11.

At step S804, image processing unit 1004 obtains an S-component differential image d(i) from the S-component normalized image Γ(i) and the S-component reconstructed image $\hat{\Gamma}(i)$ generated at step S802, by using Equation 7. At step S806, the image processing unit 1004 stretches the S-component differential image d(i) by using Equation 8, to thereby obtain an S-component differential image D(i) in which facial features are reflected.

As step S808, image processing unit 1004 calculates an average of errors within non-occlusion regions of the S-component differential image D(i) by using Equation 9, to thereby obtain the lower threshold $T_L$. Image processing unit 1004 further computes an average of errors greater than the lower threshold $T_L$ within the S-component differential image D(i), to thereby obtain the upper threshold $T_H$, at step S808.

At step S810, image processing unit 1004 applies a weight of 1 on occlusion regions of the S-component differential image D(i), a weight of 0 on the non-occlusion regions, and a weight having a value of 0.5 to 1 on uncertain regions by using Equation 10, to thereby generate an S-component compensated image. Similar to the processing of the I-component normalized image, an image reconstructed from the S-component compensated image, which is generated at the first iteration (t=0), is used as an S-component reconstructed image $\hat{I}'(i)$ at the second iteration of the recursive PCA reconstruction.

Figure 12:
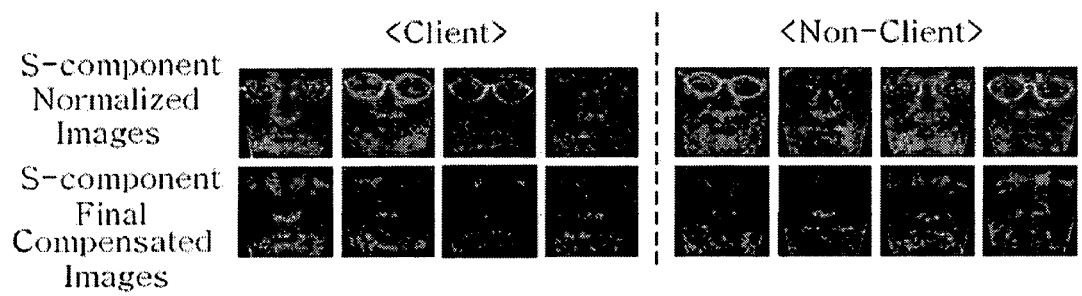
FIG. 12 is S-component normalized images and S-component compensated images obtained from the S-component normalized images in accordance with the present invention.

At step S812, image processing unit 1004 determines, using Equation 13, whether a difference between the S-component reconstructed images generated by the recursive PCA reconstruction is less than or equal to a predetermined value θ. Where the difference is less than the predetermined value θ, image processing unit 1004 stops the recursive PCA reconstruction to obtain the current compensated image as an S-component final compensated image (hereinafter, referred as an S' image). The S' image is shown in FIG. 12. Otherwise, image processing unit 1004 returns to step S802.

An H-component normalized image is processed similar to the S-component normalized image described with reference to FIG. 8. Herein, H-component is represented as vectors of $(H_x, H_y)^T$ using Equation 14.

$$H_x = \cos(H)$$

$$H_y = \sin(H) \quad \text{(Eq. 14)}$$

Figure 13:
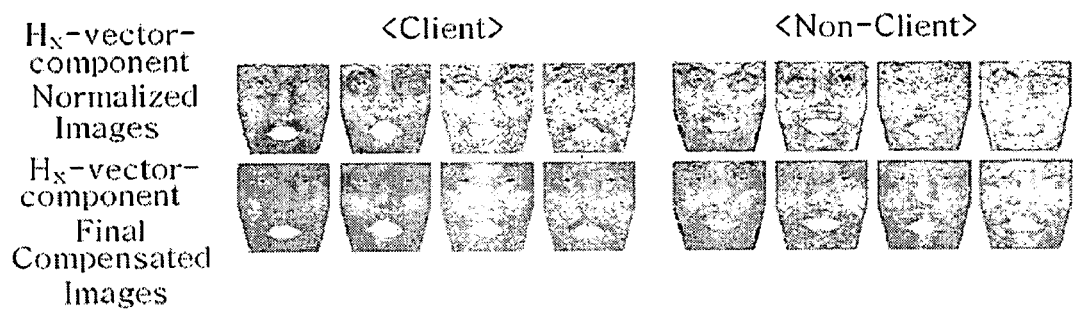
FIG. 13 is $H_x$-vector-component normalized images and $H_x$-vector-component compensated images obtained from the $H_x$-vector-component normalized images in accordance with the present invention.
Figure 14:
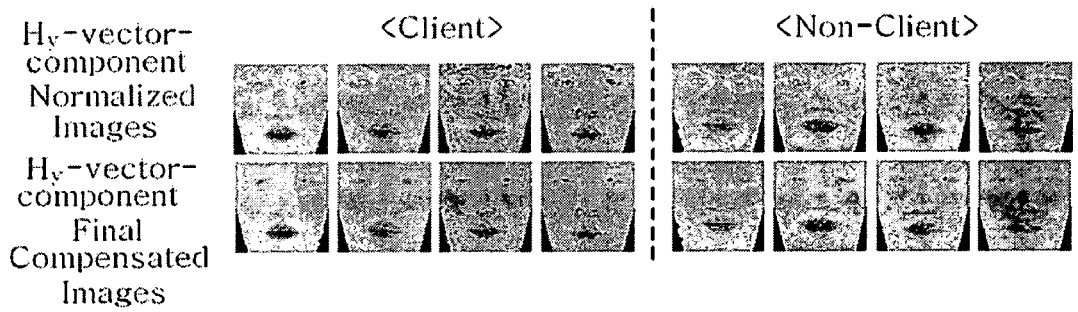
FIG. 14 is $H_y$-vector-component normalized images and $H_y$-vector-component compensated images obtained from the $H_y$-vector-component normalized images in accordance with the present invention.

As is well known in the art, in HIS model, H-component is expressed in an angular coordinate system in which a zero and 360 degrees show the same color different from I- and S-components. In case of applying the recursive PCA reconstruction to the H-component normalized image, it is necessary to do not discriminate a color at zero degree from a color at 360 degrees. Therefore, the present invention utilizes the vectors of $(H_x, H_y)^T$ instead of the H-component. $H_x$- and $H_y$-vector-component normalized images are shown in FIGS. 13 and 14, respectively. Similar to the S-component normalized image, the $H_x$- and $H_y$-vector-component normalized images are stretched to have values of 0 to 255, before applying the recursive PCA reconstruction thereto. $H'_x$- and $H'_y$-vector-component compensated images obtained by processing the $H_x$- and $H_y$-vector-component normalized images according to the recursive PCA reconstruction are shown in FIGS. 13 and 14, respectively.

In order to obtain an H-component final compensated image (hereinafter, referred as an H' image), restoring $H'_x$- and $H'_y$-vector-component compensated images which were stretched is performed to apply the recursive PCA reconstruction thereto. Using Equation 15, the H' image is obtained with respect to the H-component normalized image.

$$H''_x = \frac{H'_x}{\sqrt{H'^2_x + H'^2_y}} \quad \text{(Eq. 15)}$$

$$H' = \cos^{-1}(H''_x).$$

Herein, since the $H'_x$- and $H'_y$-vector-component compensated images do not satisfy the relationship of $H'^2_x + H'^2_y$, $H'_x$ is normalized to $(H'^2_x + H'^2_y)^{1/2}$, thereby obtaining $H''_x$. Then, H' is calculated within a range of 0 to 360 degrees on the basis of $H''_x$.

Using Equation 16, the HSI-RGB transformation is performed on the H', S', and I' images. The S' and I' images are subjected to serve the restoring process similar to the H' image. After the HSI-RGB transformation, R'-, G'-, and B'-component images are obtained. Using Equation 16, a final color image is obtained on the basis of the R'-, G'-, and B'-component images. This process is widely known in the art so that detailed explanation will be omitted herein.

If, $0 < H' \leq 120°$ \quad (Eq. 16)

then $b = \frac{1}{3}(1 - S')$ $r = \frac{1}{3}(1 + [(S'\cos H')/(\cos(60° - H'))])$ $g = 1 - (b + r)$ if, $120° < H' \leq 240°$ then $H' = H' - 120°$ $r = \frac{1}{3}(1 - S)$ $g = \frac{1}{3}(1 + [(S'\cos H')/(\cos(60° - H'))])$ $b = 1 - (r + g)$ if, $240° < H' \leq 360°$ then $H' = H' - 120°$ $g = \frac{1}{3}(1 - S')$ $b = \frac{1}{3}(1 + [(S'\cos H')/(\cos(60° - H'))])$ $r = 1 - (g + b)$ where $R' = 3I'r$ $G' = 3I'g$ $B' = 3I'b$ wherein r, g, and b are normalization values within a range of 0 to 1, which satisfy r+g+b=1, respectively. Equations 6 and 16 are well known in the art and detailed explanation will be omitted herein. (See R. C. Gonzalez and R. E. Woods, "Digital Image Processing," Addison-Wesley Publishing Company, 1992).

INDUSTRIAL APPLICABILITY

As described above, in accordance with the present invention, natural looking high quality glassless color frontal facial images are obtained by simultaneously finding occlusion regions to be removed within input facial images and compensating the same. The occlusion regions include not only a glasses frame region but also reflection and shading regions due to lens and glasses. Further, the image processing method in accordance with the present invention is used to resolve other various occlusion problems and improves the recognition efficiency of automatic face recognition systems.

While the present invention has been shown and described with respect to the particular embodiments, those skilled in the art will recognize that many changes and modifications may be made without departing from the scope of the invention as defined in the appended claims.

The invention claimed is:

1. An image processing method for obtaining a glassless image from a color frontal facial image bearing glasses, comprising the steps of:
   a) receiving an RGB color frontal facial image bearing glasses, wherein RGB are red-, green-, and blue-component contained in the received RGB color frontal facial image;
   b) extracting candidates of eye regions from the received RGB color frontal facial image;
   c) determining an exact eye region out of the candidates and normalizing the received RGB color frontal facial image in a predetermined size by centering on the determined eye region;
   d) extracting a glasses frame region by using color information contained in the received RGB color frontal facial image and edge information of a glasses frame;
   e) performing an RGB-HSI transformation on the normalized frontal facial image;
   f) generating H', S', and I' glassless compensated images on the basis of the RGB-HSI transformed H-, S-, and I-component normalized frontal facial images, wherein the H-, S-, and I-component represent a hue, a saturation, and an intensity, respectively;
   g) obtaining R', G', and B' compensated images by performing an HSI-RGB transformation on the H', S', and I' glassless compensated images; and
   h) creating a glassless final color facial image on the basis of the R', G', and B' compensated images,
   wherein the step f) further comprises the steps of:
   f1) obtaining H-, S-, and I-component reconstructed images by reconstructing the H-, S-, and I-component normalized frontal facial images;
   f2) obtaining H-, S-, and I-component first differential images between the H-, S-, and I-component normalized frontal facial images and the H-, S-, I-component reconstructed images;
   f3) obtaining H-, S-, and I-component second differential images by stretching H-, S-, and I-component first differential images on the basis of pixel information contained in the H-, S-, and I-component first differential images;
   f4) determining thresholds to classify the H-, S-, and I-component second differential images into occlusion regions, non-occlusion regions, and uncertain regions;
   f5) obtaining an I-component third differential image by including the extracted glasses frame region onto the uncertain region classified by the threshold within the I-component second differential image;
   f6) classifying the H- and S-component second differential images and the I-component third differential image on the basis of the thresholds to determine a weight to be applied on the respective classified images; and
   f7) obtaining the H', S', and I' compensated images by applying the weight on each of the H- and S-component second differential images and the I-component third differential image.

2. The image processing method of claim 1, wherein the H-component normalized frontal facial image is expressed as $H_x$- and $H_y$-vector-component images as follows:

$$H_x = \cos(H)$$

$$H_y = \sin(H)$$

wherein $H'_x$ and $H'_y$ compensated images are obtained on the basis of the $H_x$- and $H_y$-vector-component images.

3. The image processing method of claim 2, wherein the H'-component glassless compensated image is obtained from the $H'_x$ and $H'_y$ compensated images as follows:

$$H''_X = \frac{H'_X}{\sqrt{H'^2_X + H'^2_Y}}$$

$$H' = \cos^{-1}(H''_X)$$

wherein $H''_X$ is obtained by normalizing $H'_x$ with $(H'^2_X + H'^2_Y)^{1/2}$.

4. The image processing method of claim 1, wherein the H', S', and I' compensated images are obtained by a principal component analysis (PCA) reconstruction, and
   the step c) further comprises the steps of:
   c1) obtaining first and second transformed images on the basis of color information contained in the received RGB color frontal facial image; and
   c2) normalizing the received RGB color frontal facial image by using the first and second transformed images.

5. The image processing method of claim 4, wherein the first and second transformed images are a generalized skin color distribution (GSCD) image and a black and white color distribution (BWCD) image, respectively.

6. The image processing method of claim 5, wherein the color information is gray-level pixel information.

7. The image processing method of claim 5, wherein the stretching at step f3) is performed as follows:

$$D(i)=(\hat{\Gamma}(i)d(i))^{1/2}$$

wherein D(i) represents the H-, S-, and I-component second differential images, $\hat{\Gamma}(i)$ represents the H-, S-, and I-component reconstructed images generated during performing the PCA reconstruction, d(i) represents the H-, S-, and I-component first differential images, and i is an index for indicating pixels in each image.

8. The image processing method of claim 5, wherein the occlusion regions contain the glasses and errors due to a reflection and shade by the glasses within the received RGB color frontal facial image.

9. The image processing method of claim 8, wherein the step f4) further comprises the steps of:
   inversing the first transformed image;
   performing an OR operation on the inversed first transformed image with the second transformed image;
   determining an average of errors within the OR operated image as a lower threshold; and
   determining an average of errors greater than the lower threshold within the OR operated image as an upper threshold.

10. The image processing method of claim 9, wherein the upper and lower thresholds are determined as follows:

$$T_L = \text{mean}(D(j)),$$

where, j ∈ skin region $$T_H = \text{mean}(D(k)),$$

where, k ∈ {j|D(j)>$T_L$}, j ∈ non-skin region wherein $T_L$ and $T_H$ represent the lower and upper thresholds, respectively, D(j) represents errors of skin regions corresponding to the non-occlusion regions within the H-, S-, and I-component second differential images, and D(k) represents errors of non-skin regions corresponding to the occlusion regions within the H-, S-, and I-component second differential images.

11. The image processing method of claim 10, wherein the occlusion regions in the I-component second differential image includes the glasses frame region, which is extracted as follows:

If, $D(i) < T_H$ then $D'(i) = \max(D(i), G(i))$, where, $i=1, \ldots, N$ if, $D(i) \geq T_H$ then $D'(i) = D(i)$ wherein the I-component third differential image is obtained on the basis of the I-component second differential image including the glasses frame region, D'(i) represents the I-component third differential image, and G(i) represents gray-level values of the extracted glasses frame region.

12. The image processing method of claim 11, wherein the weights are determined as follows:

If, $D'(i) \geq T_H$ then $\omega(i) = 1$ if, $T_L \leq D'(i) < T_H$ then $\omega(i) = 1 - 0.5 \frac{T_H - D'(i)}{T_H - T_L}$ else $\omega(i) = 0$ wherein a weight of 1 is applied on regions having error values greater than the upper threshold within the I-component third differential image, a weight of 0 on regions having error values less than the lower threshold, and a weight with a value from 0.5 to 1 on regions having error values between the upper and lower thresholds, and wherein the regions having the error values greater than the upper threshold are the occlusion regions, the regions having the error values less than the lower threshold are the non-occlusion regions, and the regions having the error values between the upper and lower thresholds are the uncertain regions.

13. The image processing method of claim 12, wherein the occlusion regions within the I-component third differential image are compensated as follows:

If (t=0)

then $\Gamma_t'(i) = \omega \cdot \phi + (1-\omega) \cdot \Gamma(i)$ else $\Gamma_t'(i) = \omega \cdot \hat{\Gamma}_t(i) + 91 - \omega) \cdot \Gamma(i)$ wherein $\Gamma_t'(i)$ represents the I' compensated image, $\omega$ represents the weights, $\phi$ represents an I-component average image, $\hat{\Gamma}_t(i)$ is the I-component reconstructed image, and $\Gamma(i)$ is the I-component normalized frontal facial image.

14. The image processing method of claim 10, wherein a weight of 1 is applied on regions having error values greater than the upper threshold within the H- and S-component second differential images, a weight of 0 on regions having error values less than the lower threshold, and a weight with a value from 0.5 to 1 on regions having error values between the lower and upper threshold, wherein the regions having the error values greater than the upper threshold are the occlusion regions, the regions having the error values less than the lower threshold are the non-occlusion regions, and the regions having the error values between the upper and lower thresholds are the uncertain regions.

15. The image processing method of claim 14, wherein the occlusion regions within the H- and S-component second differential images are compensated as follows:

If (t=0)

then $\Gamma_t'(i) = \omega \cdot \phi + (1-\omega) \cdot \Gamma(i)$ else $\Gamma_t'(i) = \omega \cdot \hat{\Gamma}_t(i) + (1-\omega) \cdot \Gamma(i)$ wherein $\Gamma_t'(i)$ represents the H' and S' compensated images, $\omega$ represents the weights, $\phi$ represents H- and S-component average images, $\hat{\Gamma}_t(i)$ is the H- and S-component reconstructed images, and $\Gamma(i)$ is the H- and S-component normalized frontal facial images.

16. The image processing method of claim 13 or 15, further comprising the step of repeating the steps f1) to f7), wherein the H', S', and I' compensated images obtained at step f7) are used at step f1) instead of the H-, S-, and I-component normalized frontal facial images when performing the repeating step.

17. The image processing method of claim 16, further comprising the steps of:

determining whether each difference between the H', S', and I' compensated images obtained at step f7) and H', S', and I' compensated images obtained after performing the repeating step is less than the predetermined value or not;

performing, if each difference is less than the predetermined value, the HSI-RGB transformation on the H', S', and I' compensated images obtained after performing the repeating step, to thereby obtain the glassless final color facial image based on the transformed H', S', and I' compensated images obtained after performing the repeating step; and performing the repeating step, if each difference is greater than the predetermined value.

* * * * *